United States Patent
Whitworth et al.

(10) Patent No.: US 11,150,356 B2
(45) Date of Patent: Oct. 19, 2021

(54) METHOD OF TESTING A PNT CONFIGURATION

(71) Applicant: Nottingham Scientific Limited, Nottingham (GB)

(72) Inventors: Timothy Christopher Whitworth, Nottingham (GB); Yeqiu Ying, Nottingham (GB); Mark Dumville, Nottingham (GB); John Pottle, Paignton (GB); Guy Buesnel, Paignton (GB)

(73) Assignee: NOTTINGHAM SCIENTIFIC LIMITED, Notthingham (GB)

( * ) Notice: Subject to any disclaimer, the term of this patent is extended or adjusted under 35 U.S.C. 154(b) by 443 days.

(21) Appl. No.: 15/738,880

(22) PCT Filed: Jun. 24, 2016

(86) PCT No.: PCT/GB2016/051907
§ 371 (c)(1),
(2) Date: Dec. 21, 2017

(87) PCT Pub. No.: WO2016/207658
PCT Pub. Date: Dec. 29, 2016

(65) Prior Publication Data
US 2018/0188379 A1    Jul. 5, 2018

(30) Foreign Application Priority Data
Jun. 24, 2015   (GB) ...................................... 1511157

(51) Int. Cl.
*G01S 19/23*    (2010.01)
*G01S 19/01*    (2010.01)
*G01S 19/21*    (2010.01)

(52) U.S. Cl.
CPC ............ *G01S 19/23* (2013.01); *G01S 19/015* (2013.01); *G01S 19/21* (2013.01)

(58) Field of Classification Search
CPC ......... G01S 19/23; G01S 19/015; G01S 19/21
(Continued)

(56) References Cited

U.S. PATENT DOCUMENTS

| 5,457,460 | A | * | 10/1995 | Tran | ........................... | G01S 7/36 |
| | | | | | | 342/13 |
| 5,549,477 | A | * | 8/1996 | Tran | ........................ | G01S 7/021 |
| | | | | | | 434/5 |

(Continued)

FOREIGN PATENT DOCUMENTS

| CA | 2800193 A1 | * 12/2011 | ............... G01S 1/08 |
| CN | 102866407 A | 1/2013 | |

(Continued)

OTHER PUBLICATIONS

Search Report for GB 1511157.8 dated Oct. 1, 2015, 4 pp.
(Continued)

*Primary Examiner* — Vladimir Magloire
*Assistant Examiner* — Nuzhat Pervin
(74) *Attorney, Agent, or Firm* — Lathrop GPM LLP

(57) ABSTRACT

Methods and apparatus for generating a test signal for a PNT configuration, and for testing a PNT configuration are disclosed. One such method comprises the steps of using one or more GNSS jamming signal detectors (100) to detect at least three different types of threat signal, each being an RF-based man-made GNSS jamming signal, and recording, to a database, information for the threat signals; receiving, from the database, information for at least one of the threat signals; generating a corresponding threat signal from the (Continued)

received information; and combining the corresponding threat signal with a PNT signal via a signal combiner to generate the test signal.

17 Claims, 1 Drawing Sheet

(58) Field of Classification Search
USPC .......................................................... 342/16
See application file for complete search history.

(56) References Cited

U.S. PATENT DOCUMENTS

| | | | | | |
|---|---|---|---|---|---|
| 7,266,532 | B2* | 9/2007 | Sutton | ...................... | H04L 29/06 706/12 |
| 8,314,732 | B2* | 11/2012 | Oswald | ................... | G01S 7/415 342/90 |
| 8,860,602 | B2* | 10/2014 | Nohara | ................... | G01S 7/003 342/26 R |
| 9,316,727 | B2* | 4/2016 | Sentelle | ................ | G01S 13/42 |
| 2002/0053989 | A1* | 5/2002 | Lin | ........................... | H04K 3/28 342/357.59 |
| 2010/0045506 | A1* | 2/2010 | Law | .......................... | H04K 3/22 342/13 |
| 2011/0102259 | A1* | 5/2011 | Ledvina | ................. | G01S 19/215 342/357.59 |
| 2013/0251150 | A1* | 9/2013 | Chassagne | ............ | H04W 12/06 380/270 |
| 2013/0338958 | A1* | 12/2013 | Shanishchara | ......... | G01C 25/00 702/116 |
| 2014/0240161 | A1* | 8/2014 | Davidson | .............. | G01S 7/4806 342/14 |
| 2014/0327581 | A1* | 11/2014 | Murphy | ................... | G01S 3/043 342/417 |
| 2014/0342675 | A1* | 11/2014 | Massarella | ............. | H04B 17/00 455/67.14 |
| 2015/0226858 | A1* | 8/2015 | Leibner | .................... | H04K 3/90 342/357.59 |
| 2016/0011318 | A1* | 1/2016 | Cohen | ..................... | G01S 19/45 342/357.26 |
| 2016/0349375 | A1* | 12/2016 | Littlefield | ................. | G01S 5/06 |
| 2017/0261615 | A1* | 9/2017 | Ying | ........................ | H04K 3/90 |
| 2020/0037166 | A1* | 1/2020 | Shattil | ...................... | H04K 3/44 |

FOREIGN PATENT DOCUMENTS

| | | | | |
|---|---|---|---|---|
| CN | 202794534 U | 3/2013 | | |
| EP | 2796895 A1 * | 10/2014 | ........... | G01S 19/215 |
| KR | 1020140135354 A | 11/2014 | | |
| KR | 2015 0050617 | 5/2015 | | |
| KR | 2015/0050617 A | 5/2015 | | |
| WO | WO-2011157554 A1 * | 12/2011 | ............ | G01S 19/02 |

OTHER PUBLICATIONS

International Search Report for PCT/GB2016/051907 dated Oct. 10, 2016.
International Search Report of PCT/GB2016/051907 dated Oct. 4, 2016, 3 pp.

* cited by examiner

METHOD OF TESTING A PNT CONFIGURATION

FIELD OF THE INVENTION

The present invention concerns methods and systems for testing the performance of a position, navigation and timing ("PNT") configuration such as for example a global navigation satellite system ("GNSS") receiver or other PNT user system. More particularly, but not exclusively, this invention concerns methods and systems for generating threat signals suitable for testing the performance of GNSS receivers and other PNT (positioning, navigation, and timing) configurations.

BACKGROUND OF THE INVENTION

In recent years, GNSS has been included in a rapidly increasing number of applications in various sectors, including those regarded to be critical as they concern safety and financial transactions. A major threat to the widespread adoption and use of GNSS is its vulnerability to signal interference and jamming, which can severely degrade the GNSS service and impact performance. Effects range from a loss of accuracy to complete denial of GNSS services. The threat of unintentional interference has been recognized for some time, and includes interference from solar effects, and man-made RF signals. The threat of intentional jamming is also a potential source of interference, particularly due to the low cost and wide availability of civilian jammers such as so called personal privacy protection device (PPD).

There is a desire and/or need for new GNSS receivers, and other position, navigation and timing ("PNT") user equipment, to have increased resiliency to such real-world threats (whether intentional or unintentional) to the reliable operation of the user equipment. The present inventors have therefore recognised that there would be benefit in providing an effective means for testing the resiliency of PNT user equipment to such threats.

Document CN102866407, published September 2013, discloses an anti-interference test simulator, comprising a satellite navigation message generation module and an interference source. The document discloses a rudimentary method for testing a GNSS receiver but does not provide a robust or a means of objectively testing the likely resiliency of a GNSS receiver when used outside a testing facility/laboratory.

The present invention seeks to mitigate at least some of the above-mentioned problems. Alternatively or additionally, the present invention seeks to provide improved methods and systems for testing the performance of GNSS receivers or other PNT user equipment.

SUMMARY OF THE INVENTION

The present invention provides, according to a first aspect, a method of generating a test signal for testing a GNSS receiver or other PNT configuration, the test signal including a threat signal. The other PNT configurations that may be suitable for testing include, but are not limited to: a configuration of a plurality of GNSS receivers or other RF-based PNT antennas; Controlled Radiation Pattern Antenna (CRPA) configurations; and Satellite-based Augmentation Systems (SBAS). The invention has application when the PNT configuration is in the form of a single receiver or chipset. The PNT configuration may comprise an arrangement of one or more GNSS or other RF-based PNT receivers, PNT antennas, PNT chipsets, PNT modules, PNT terminals, and/or any other device that integrates such a receiver, antenna, chipset, module, or terminal. For example, the PNT configuration may be in the form of a device that includes PNT functionality, as well as other functionality. Such a device may be in the form of a smart phone, vehicle infotainment system or the like. The PNT configuration may be in the form of a single item of PNT user equipment, such as a GPS receiver. The invention has particular, but not exclusive, application in relation to GNSS-based PNT configurations. The invention may also have application when the PNT configuration is in the form of other non-GNSS PNT receivers or equipment using radio frequency signals such as LORAN-C or eLORAN or other low radio-frequency, LOng-RAnge Navigation (LORAN) land-based PNT systems.

The method comprises a step of using one or more GNSS jamming signal detectors to detect at least three different types of threat signal each being an RF-based man-made GNSS jamming signal, and recording the threat signal, to a database. It may be that several threat signals are observed and recorded over a period of time, and subsequently transferred to the database. It may be that the step comprises reproducing, extracting or otherwise acquiring threat signal data therefrom, and recording such data for subsequent use in the database. The acquiring such data with a GNSS jamming signal detector may be performed at one or more different locations and with one or more different apparatuses and/or performed in advance (for example many weeks before).

The method comprises a step of receiving, for example from a database, threat signal information. The database has a store of data that may include data representing three or more types of threat signal. In embodiments of the invention, the data representing threat signals in the database includes data representing "real-world" threat signals. It will be understood that a real-world threat signal is any signal which may be observed and recorded in the real-world. The real-world threat signal, as stored in the database, may be a substantially direct reproduction of an observed and recorded signal. Alternatively, the real-world threat signal, as stored in the database, may be derived from such an observed and recorded signal, for example so that only certain characteristics or features of the real-world threat signal are stored in the database.

The method comprises a step of generating a corresponding threat signal from the received information. The method comprises a step of combining the corresponding threat signal with a PNT signal (for example a GNSS signal) via a signal combiner to generate the test signal.

Thus, the performance of a GNSS receiver or other PNT configuration (for example, the performance of its ability to extract reliably GNSS data, and/or position, navigation and timing estimation (PNT) data, from a signal that includes interference from a threat signal and/or otherwise cope with the interference from a threat signal) may be tested against one or more of a number of different threat signals that are of a type that may actually be observed in the real-world.

The RF frequency of the threat signal generated may be within a range of 800 MHz to 2 GHz. The RF frequency of the threat signal generated may be within a band of operation of the GNSS signals (e.g. within the L1 or L2 bands). The RF frequency of the test signal generated may be within a band of operation of the GNSS signals (e.g. within the L1 or L2 bands). The threat signals represented in the database may comprise various types of real-world threat signals, particularly man-made signals. The threat signals represented in the database may comprise man-made GNSS jamming signals. The threat signals may comprise a spoofing signal (that is a non-genuine PNT signal, or component thereof), designed to compete with or otherwise disrupt the correct receipt and processing of the genuine PNT signal. The threat signals represented in the database may comprise accidental RFI threat signals. The threat signals may comprise a signal designed to attack a receiver through other interfaces, such as the communications or diagnostics ports. It will be appreciated however that the present invention has particular (although not exclusive) application in relation to real-world-observed man-made RF-based threat signals.

The method or the apparatus of the present invention may have additional functionality (for example, in addition to the ability to generate a test signal as a combination of an otherwise substantially uncorrupted/not-interfered-with, but perhaps noisy, PNT signal with a generated threat signal) so that test signals may alternatively be generated without combining a PNT signal and a threat signal. Such an alternative test signal may comprise a PNT signal, the extractable data represented by which being corrupted or otherwise deficient. For example, such an alternative test signal may comprise a signal generated by (or simulated to imitate) faulty GNSS or other RF PNT transmitter equipment. Such an alternative test signal may comprise a so-called "evil waveform", which is artificially corrupted at the system level, for example having an improper autocorrelation function and/or containing incorrect navigation messages, or an otherwise improper waveform. The database may for example additionally hold data representing different types of evil waveform signals, where the codes used are valid GNSS spreading codes, but the waveforms have impairments such as ringing, over-dampening, and lag. Alternatively or additionally, the database may hold data representing otherwise normal PNT waveform signals, but for which the navigation codes contain inaccurate data bits, which for example are designed to cause errors in the software of GNSS receivers.

The method or the apparatus of the present invention may have additional functionality so that test signals may be generated so as to represent a PNT signal that has been affected by environmental conditions. For example, the test signal may be generated to simulate multipath effects. The test signal may be generated to simulate solar weather effects.

The database may comprise data collected from communication and/or diagnostic signals to a GNSS receiver designed to cause software failures.

The data relating to the different types of real-world threat signals may include a copy of a spectrogram representing a RFI threat signal that has been extracted from a real-world observation of interference suffered by a PNT configuration, such as for example a GNSS interference detector as disclosed in UK patent application number 1416365.3. The spectrogram may comprise information concerning the threat signal detected across the time domain. The spectrogram may comprise information concerning the threat signal detected across the frequency domain. The spectrogram may comprise information concerning the power of the threat signal detected. The spectrogram may comprise information concerning the power of the threat signal detected at a given frequency, or the average power over a range of frequencies. The spectrogram may comprise information concerning the power of the threat signal detected at a given time, or the average power over a time period. The power information may be in the form of an indication of amplitude of threat signal, for example peak-to-peak amplitude and/or root-mean-square (RMS) value of the signal amplitude. The spectrogram may be in the form of a two dimensional matrix (for example a table or an array) of power values with one dimension representing signal frequency and the other dimension representing time. The spectrogram may comprise one or more analogue representations of the threat signal, but it is preferred from the spectrogram to be digitally represented. In the case where the spectrogram is in the form of a matrix, it may be considered as comprising cells of values, for example power values, arranged in rows and columns such representing frequency and time axes.

The data stored in the database relating to the different types of real-world threat signals may include an indication of the classification of the type of signal and threats. The data stored in the database relating to the different types of real-world threat signals may include an indication of the classification of the type of signal, type of threats, and one or more other parameters that enable a spectrogram of the threat signal to be recreated.

The database may hold data for at least 5 different types (and preferably more than 10 different types) of threat signal. The database may hold data for different types of threat signal including at least 5 different types (preferably at least 10 different types) in the group consisting of: non-pulsed wide band noise, non-pulsed narrow band noise, non-pulsed single tone, non-pulsed multi-tone, non-pulsed CDMA (code division multiple access) signal, pulsed wide band noise, pulsed narrow band noise, pulsed single tone, pulsed multi-tone, pulsed CDMA, non-pulsed sawtooth chirp, non-pulsed triangular chirp, non-pulsed chirp (not being sawtooth chirp or triangular chirp), pulsed sawtooth chirp, pulsed triangular chirp, pulsed chirp (not being sawtooth chirp or triangular chirp), continuous frequency hopped, and pulsed frequency hopped. For the different types of threat signal immediately listed above, the number of extra parameters needed to recreate (and therefore represent) a previously observed real-life threat signal may differ from type to type. For example, a threat signal of the type which is a single tone (sinewave) signal may require merely an indication of amplitude and frequency to fully define it characteristics. Other more complicated threat signals will require more parameters to fully characterise the signal.

UK patent application number 1416365.3 discloses an apparatus and methods for detecting and characterising GNSS interference signals which impair the performance of GNSS receivers and other PNT configurations. The algorithms disclosed provide a reliable method of detecting an interference event, and subsequently characterising it based on a number of categories. The types of real-world threats that can be detected, and how they may be classified is described and claimed in that UK patent application. The contents of that application are fully incorporated herein by reference. The claims of the present application may incorporate any of the features disclosed in that patent application. In particular, the claims of the present application may be amended to include features relating to the types (classes) of jamming signal (threats) that may be generated in the context of the present invention. The claims of the present application may also be amended to include features relating to the presence and/or use of data relating to jamming signals recorded and/or classified by the apparatus/method of GB1416365.3.

The database may hold data for at least 5 different types by means of representing the threat signals with IQ baseband information. Such IQ base-band information may be derived from base-band samples extracted from real-life captured RF signals.

The database may additionally include information that enables a synthesised threat signal to be generated that is not directly derived from real-world threat data, for example, chirp signals that sweep more quickly than those captured so far in the real-world.

There may be a step of receiving the PNT signal (e.g. GNSS signal) with which said corresponding threat signal is combined. The PNT signal (e.g. GNSS signal) may be received from a GNSS signal synthesiser. The PNT signal (e.g. GNSS signal) may be received from a real-world PNT signal (e.g. an off-the-air GNSS signal).

The data in the database may include data representing one or more of different recorded real-world threat signals. Such data may be in the form of the raw data so recorded, which may (see below also) be processed before or after to separate out the threat signal from the PNT signal. Such raw data may be used to generate a threat signal which is substantially a direct replication of the threat signal so recorded.

It may be that the information for a threat signal received from the database is in the form of information originating from a recorded signal.

The recorded signal may for example be a detected GNSS signal that includes interference. The interference may be extracted (for example by filtering) from the recorded signal in order to provide an indication of the threat signal. Noise may be filtered out from such signals. It will therefore be appreciated that the information received is derived from the recorded signal and is not therefore a direct replication of the recorded signal.

It may be that the information originating from the recorded signal is of a signal derived from the recorded signal.

The step of receiving information originating from a recorded signal may comprise receiving one or more characteristics of the recorded signal from the database.

A characteristic may for example be in the form of the class of threat signal as mentioned above and/or one or more parameters that enable the threat signal to be synthesised.

The characteristic of the threat signal may be provided in addition to the information received from the database particular when the information is in the form of a recording of the threat signal (for example the raw data representing the recording of a threat signal).

The information stored in the database may thus be of or concerning threat signals without a PNT signal component. Such information may have been stored after data/signals comprising both a threat signal component and a PNT signal component have been processed to extract the threat signal (or date relating thereto) and/or to filter out non-threat signals/data.

When the information stored in the database is in the form of data representing a real-life recorded threat signal which may therefore be mixed with noise and/or a PNT signal, it may be desirable to extract from the data the threat signal and so reduce the effects of such noise and/or the recorded PNT signal. This may be achieved with filtering.

The step of generating a corresponding signal from the information may comprises a step of filtering the information based on a characteristic of the recorded signal. The step of generating a corresponding signal from the information may comprises a step of producing the corresponding signal from such filtered information.

It may be that the characteristic of the recorded signal concerns a parameter defining the variation of the signal in the time domain.

It may be that the characteristic concerns a parameter defining indicating the bandwidth of the recorded signal. The information may be filtered in the frequency domain based on the bandwidth of the detected signal. Thus, the filtering may also be time-dependent, for example when generating a threat signal being in the form of a frequency hopping signal.

The database may comprise data in addition to the data representing real-world-observed man-made RF-based threat signals. The database may comprise data collected from a previously detected spoofing signal. The database may comprise data collected from a previously detected signal generated by solar weather. The database may comprise data collected with GNSS system level impairment threats, such as evil waveforms and improper navigation bits. The database may comprise data collected from a previously detected corrupting signal. It may be that the combination of the threat signal and the PNT signal (e.g. GNSS signal) generates a corrupted PNT signal (e.g. a corrupted GNSS signal). Preferably the database comprises at least two, and possibly all three of, a spoofing signal; a signal generated by solar weather; and an evil waveform (including for example a corrupting GNSS signal and/or a corrupting communications signal, or other signal designed to cause software failures in GNSS/PNT signal receiving/processing apparatus).

The corrupting signal may be in the form of a jamming signal, for example a man-made jamming signal created specifically for the purpose of interfering with GNSS signals.

It may be that database comprises data collected from a GNSS interrupting signal detected by a GNSS jamming signal detector.

There may be a step of receiving an input from a user, which is used in the step of generating the threat signal. For example, the input from the user may comprise a selection of a type of threat signal. The input from the user may comprise a selection of a specific threat signal. The input from the user may comprise a selection of one or more parameters that define characteristics of the threat signal. The input from the user may comprise interaction with the database of threat signals. The performance of a method in which a threat signal is generated in accordance with a user input and then used to create a test signal may have application independently of the first aspect of the invention. The user may select the type of threat signal from the database. The user may provide an input which sets a duration of the threat signal. The user may provide an input which sets the power level of the threat signal. The user may provide one or more other inputs which set one or more parameters which define the characteristics of a particular type of threat signal (for example carrier frequency profile, pulse characteristics, and the like).

The method may be used to simulate multiple threats simultaneously. It may for example be that the method comprises a step of generating more than one threat signal, and a subsequent step of combining all such threat signals so generated with a PNT signal to generate the test signal. The test signal can thus be used to simulate multiple threats simultaneously. A user may select which multiple threats to simulate.

The method may be used to simulate different threats over time. A user may for example select a program that causes simulation of different types of threats, or combinations of threats, at different times.

There may be a first time when the test signal simulates at least one threat representing a first scenario and a second (for example later) time when the test signal simulates at least one threat (preferably multiple threats) representing a second different scenario.

According to a second aspect of the invention there is also provided a method of generating a test signal for testing a PNT configuration (e.g. GNSS receiver), comprising the steps of receiving an input from a user, for example a human operator. There may be a step of generating a corresponding signal based on the input of the user. There may be a step of receiving a PNT signal (e.g. a GNSS signal). There may be a step of combining the corresponding signal generated based on the input of the user and a GNSS signal, for example via a signal combiner, to generate the test signal.

The input from the user may comprise a selection of a type of threat signal. The input from the user may comprise a selection of a specific threat signal. The input from the user may comprise a selection of one or more parameters that define characteristics of the threat signal. The input from the user may comprise interaction with a database of threat signals.

According to a third aspect of the invention there is also provided a method for testing a PNT configuration (for example a GNSS receiver), comprising the steps of generating a test signal in accordance with any aspect of the present invention as claimed or described herein, including any optional features relating thereto, transmitting the test signal to the PNT configuration (e.g. GNSS receiver); and then receiving an output of the GNSS receiver. The output of the PNT configuration (e.g. GNSS receiver) may for example provide an indication on how the PNT configuration (e.g. GNSS receiver) has coped with the threat signals included in the test signal, for example with the performance rating against the threat index. There may be a step of analysing the output of the PNT configuration (e.g. GNSS receiver) to provide such an indication. There may be a step of saving the output of the PNT configuration (e.g. GNSS receiver) to the database. The step of transmitting the test signal to the PNT configuration may be conducted over the air. The step of transmitting the test signal to the PNT configuration may be conducted by means of a wired connection (e.g. via one or more cables, such as coax cables for example).

According to a fourth aspect of the invention there is provided a threat signal generator for testing a GNSS receiver. The threat signal generator may be arranged to perform the step of generating a test signal in accordance with any aspect of the present invention as claimed or described herein, including any optional features relating thereto. The threat signal generator may comprise a first input for receiving information for a threat signal. The threat signal generator may comprise a computer processor with associated software for processing the information. The threat signal generator may comprise a signal processing device. The threat signal generator may be so configured that when the software is executed on the processor, the processor causes the signal processing device to perform the step of generating a corresponding signal from the received information, in accordance with any aspect of the present invention as claimed or described herein, including any optional features relating thereto. The threat signal generator may further comprise a receiver for receiving a GNSS signal and a combining device for combining the corresponding signal with the GNSS signal to produce a test signal. The threat signal generator may further comprise a second input for receiving a second output of the GNSS receiver.

According to a fifth aspect of the invention there is provided a threat signal testing system, comprising the threat signal generator in accordance with any aspect of the present invention as claimed or described herein, including any optional features relating thereto and an associated database in accordance with any aspect of the present invention as claimed or described herein, including any optional features relating thereto.

According to a sixth aspect of the invention there is provided a kit of parts for assembling a threat signal testing system in accordance with any aspect of the present invention as claimed or described herein, including any optional features relating thereto. The kit may comprise the threat signal generator and the database.

According to a seventh aspect of the invention there is provided a computer software product that when executed on a processor of a threat signal generator causes the generator to perform those steps as are performed by the computer processor in accordance with any aspect of the present invention as claimed or described herein, including any optional features relating thereto. The computer software product may include a threat signal selection module. The computer software product may include a threat signal generation module. The combining of the threat signal and the GNSS signal may be performed in software.

According to an eighth aspect of the invention there is provided a database, for example a database product, containing the information for a threat signal for use with any aspect of the present invention as claimed or described herein, including any optional features relating thereto. The database may have a store of data including data representing three or more different types of threat signal. The database product may be in the form of electronic data carried on, or stored in, computer readable media, such as ROM, RAM, or other electronic memory products.

In certain embodiments, the database may have data stored on it which represent three or more different types of threat signal, but which are stored on the database in a manner different from that described above. For example, the database may be created in a territory different from the territory in which the test signal is generated. The three or more different types of threat signal may be generated without being derived from real-world, previously observed, test signals. Thus, the invention also provides a method of generating a test signal for testing a PNT configuration (optionally in the form of a GNSS configuration), comprising the steps of (a) receiving, from a database, information for a threat signal, the database having a store of data including data representing three or more different types of threat signal, (b) generating a corresponding threat signal from the received information; and (c) combining the corresponding threat signal with a PNT signal via a signal combiner to generate the test signal. It is preferred however that the data on the database representing three or more different types of threat signal is data which has been recorded on the database in the form of information for RF-based man-made jamming signals (for example GNSS jamming signals) previously detected by one or more jamming signal detectors (for example GNSS jamming signal detectors). The method may therefore include a preceding step (whether or not performed in the same territory) of observing, and recording, to the database, information for a threat signal (for example real-world threat signals), for example using such jamming signal detectors.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
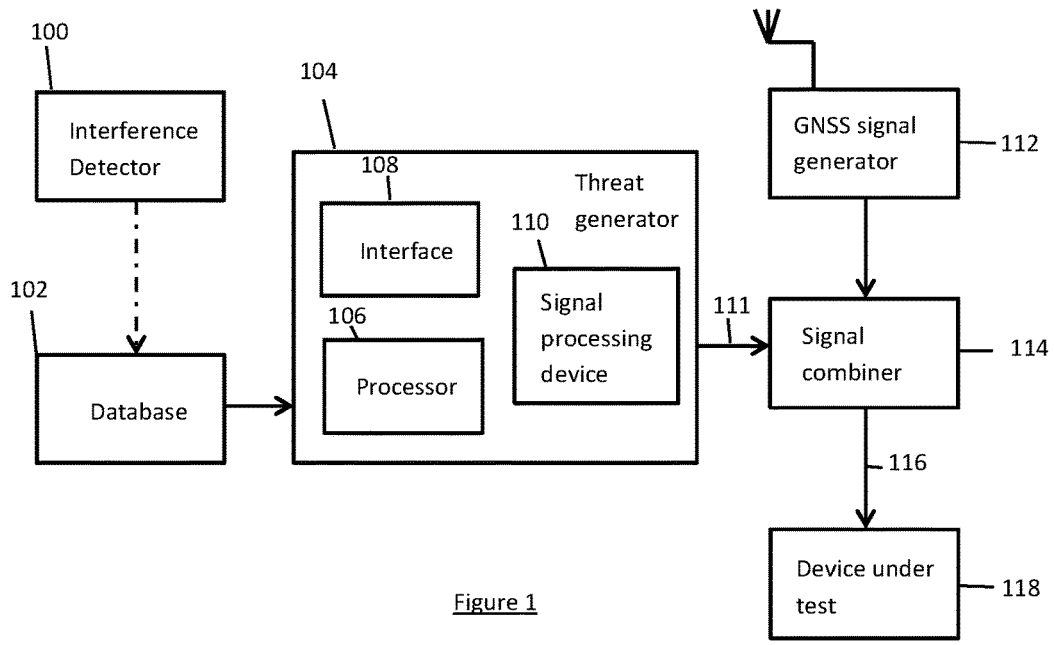
FIG. 1 shows a threat signal generating system according to a first embodiment of the invention.

A threat signal generating system in accordance with an embodiment of the invention is shown in FIG. 1. In this embodiment a threat generator 104 is configured to receive information from a database 102. The database has been previously populated with data that is derived from signals detected by an interference detector 100. It will be understood therefore that the database 102 need not be in direct or permanent communication with such an interference detector 100. In this embodiment data is collated by the interference detector 100 (although more than one such interference detector could be used to collate such data) and then used to create a library of different types of threat signal. This library can be used to populate the database. Other data, for example from other libraries of threat signals, can also be stored in the database 102. The threats detected by the threat detector 100 may include threats other than RF interference.

The interference/threat detector 100 is configured to identify a threat event, which occurs when a threat signal is emitted by a GNSS jammer/system/environmental/natural impairments, and characterises the signal according to an algorithm specified in UK patent application number 1416365.3. The interference/threat detector 100 is configured to recognise interfering signals from GNSS jammers such as single tone jammers, chirp jammers and frequency hopping jammers. The interference detector 100 is also configured to record the signal received during the interference event, along with any characterisation information, including the type of interference signal the interference detector 100 has detected. The recorded signal and the characterisation information is transmitted and saved to the database 102. In other embodiments, only the recorded signal or only the characterisation information is saved in the database.

In the present embodiment the database also contains information such as recorded signals from previous interference events, and characterisation information from previous interference events. The database includes data that facilitates the simulation of evil waveforms, in the form of a GNSS signal that includes system-level corruptions of data, which may thus be used to simulate a cyber-attack in the form of GNSS signals that seek to use data to disrupt the normal use of GNSS receivers.

The threat generator 104 comprises: a user input interface 108; a processor 106 for processing inputs received via the user input interface 108 and the information received from the database 102; and a signal processing device 110. The processor 106 is also configured to communicate with the signal processing device 110. In the present embodiment the signal processing device 110 is configured to transmit a threat signal 111 in response to an input signal from the processor 106. While in the present embodiment the database 102 is located locally to the threat generator 104, in other embodiments the database 102 is a remote database.

A GNSS signal generator 112 is configured to generate a GNSS signal. In the present embodiment, the GNSS signal generator 112 transmits a GNSS signal received off-the-air, while in other embodiments the GNSS signal generator 112 synthesises the signal from known GNSS signal codes.

A signal combiner 114 is configured to combine signals received from the signal processing device 110 and the GNSS signal generator 112, and transmit the combined signal as a test signal 116 to a device under test (DUT) 118, which in the present embodiment is in the form of a GNSS receiver.

While in the present embodiment of the GNSS signal generator 112, the signal combiner 114 (e.g. a signal mixer) and the signal processing device 110 are separate devices, in other embodiments the signal processing device 110 can perform some or all of these roles.

The apparatus of the first embodiment may be used to perform a method of generating a test signal for testing a GNSS receiver. Thus, a user requests via the input interface 108 that the threat generator 104 generate a threat signal in the form of a particular type of previously observed chirp-based RF jamming signal. In some embodiments, the processor 106 receives from the database 102 data representing the characteristics of a real-life chirp-based RF jamming signal that was previously observed and recorded by a suitable interference detector 100.

A chirp signal $S_c$ may be modelled as follows:

$$S_c = \exp(j2\pi * [A\bar{t} + 0.5B\bar{t}^2]), \text{ where } \bar{t} = \mathrm{mod}(t, C),$$

where t is time, and A, B, and C are parameters to be estimated relating to the minimum frequency, frequency gradient, and period, respectively. The data retrieved from the database in this case are the parameters A, B, and C, and the details of the way in which the signal is modelled. The user sets the desired power of the chirp signal via the user input interface 108. Many such real-life observed threats/jamming signals are signal-processed, characterised and then parametrised in this way so that they may be represented in the data-base in a memory efficient manner. The database also includes various other parameters for other types of jamming/interference such as those that might be observed when detecting threats from single-tone jammers, and jamming signals some of which can similarly be mathematically modelled in fairly simple terms. In some embodiments, the processor 106 is also configured to receive customized characteristics from an external source, via the user interface 108, of these above-mentioned parameters, instead of receiving them from the database 102.

Details of the types of threat signals that may be detected (and then signal-processed, characterised and then parametrised in this way) are provided in patent application no. GB1416365.3.

The threat generator 104 generates the chirp signal thus recreating a threat signal 111 that simulates a previously observed real-life jamming signal. The threat signal 111 is then mixed with the GNSS signal by means of the signal combiner 114 to generate the test signal 116 which is then received by the GNSS receiver 118 being tested.

Figure 2:
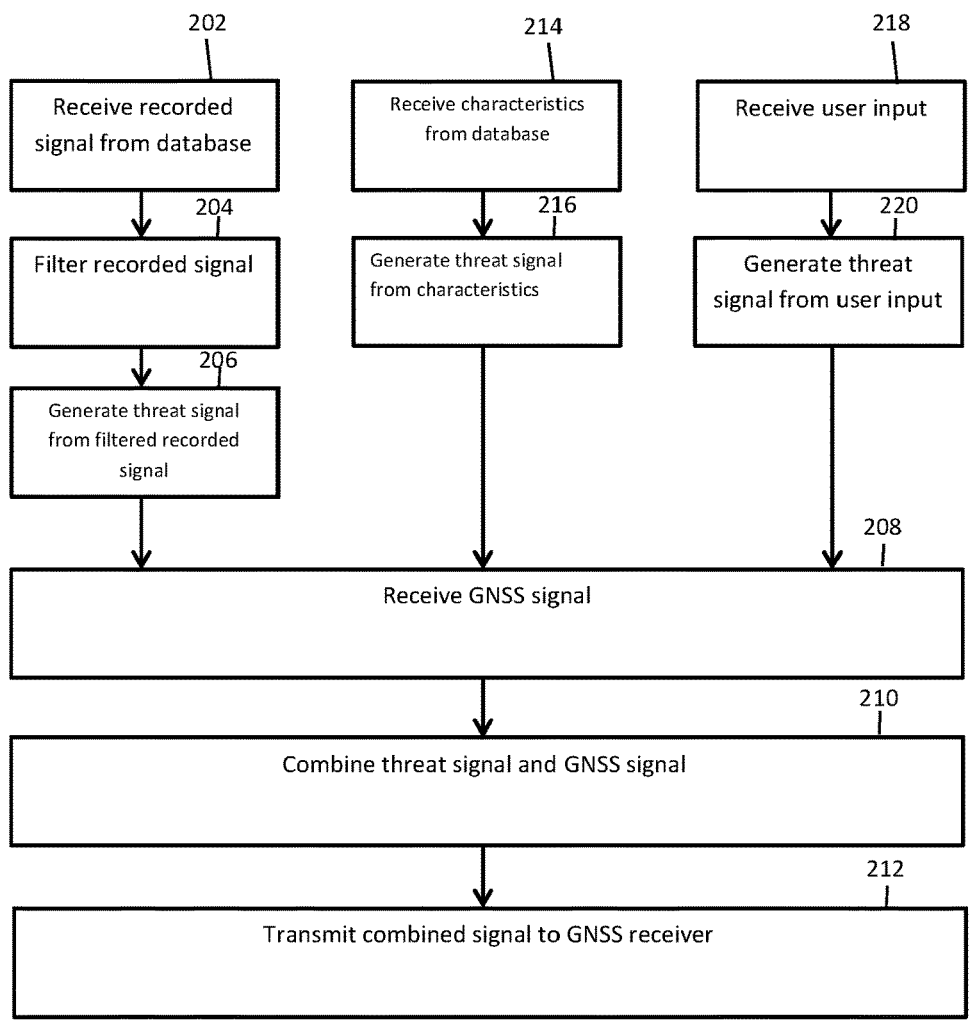
FIG. 2 shows the operation of a threat signal generating system according to a second embodiment of the invention.

A first method of generating a test signal for testing a GNSS receiver according to a second embodiment of the invention is now described, with reference to FIG. 2.

In a first step 202, a recorded signal is received by a threat generator from a database of previously recorded signals representing the raw data (in the form of IQ baseband samples) captured by a jamming signal detector, along with information about the recorded signal. As the recorded signal also contains a GNSS signal and other noise recorded by the jamming signal detector, the signal is filtered. In step 204 a signal processor is used to filter the information in order to filter out such noise. For example, if the information indicates that the detected GNSS jammer had a limited bandwidth, then the processor filters the recorded signal in the frequency domain, in order to select only signals within the correct frequency range. If the information indicates that the jammer is pulsed in the time-domain, then the processor filters the recorded signal using null-blanking (the opposite of pulse-blanking). If the information indicates that the GNSS jammer is one which only transmits a single frequency during any time-instant (for example chirp, single-tone, frequency-hopping jammers), then the processor performs a fast Fourier transform on a set of sample window (i.e. FFT-window filtering), and only keeps the frequency bin with maximum amplitude in each window, setting all other bins to zero, and then applying an inverse-FFT to recover the original jamming signal. In other embodiments, the FFT-window filtering is tested against a threshold, and only frequency bins above a certain amplitude are kept. In step 206, the filtered signal is then used to generate a simulated threat signal, by means of up-converting the filtered baseband signal to an RF frequency signal.

In step 208, a GNSS signal generator generates a GNSS signal, and in step 210 a signal mixer combines the simulated threat signal with the generated GNSS signal to create a test signal. In step 212 the signal mixer transmits the test signal to a GNSS receiver under test.

In the second embodiment there is also the possibility of performing a second method for generating a test signal for testing a GNSS receiver. In step 214, a threat signal generator (including a suitably programmed signal processor) receives information containing the characteristics of a recorded signal. For example, where the detected jammer is periodic and the frequency can be mathematically modelled, the threat signal generator receives a set of parameters defined the waveform of the signal. The threat signal generator use the same signal processing hardware as used in the first method. In step 216, the threat signal generator generates a threat signal based on the characteristic information, which is then converted into a test signal as set out in steps 208, 210 and 212, as described above in relation to the first method.

There is also the possibility of performing a third method for generating a test signal for testing a GNSS receiver.

In step 218, a threat generator (which may share at least some of the same signal processing hardware as used in the first and second methods) receives a user input via a user input interface. In the present embodiment the user input includes the user choosing one or more parameters, or otherwise defining, a custom made signal not utilising the database and therefore simulating a signal that might not necessarily have been observed and recorded in the database.

In step 220, a signal processing device generates a threat signal based on the received user input. The signal process-ing device transmits this threat signal. The test signal is then generated in steps 208, 210 and 212, as described in the first method above.

Thus, the boxes illustrated in FIG. 2 may be summarised as follows:

| Reference number | Step represented |
| --- | --- |
| 202 | Receive recorded signal from database |
| 204 | Filter recorded signal |
| 206 | Generate threat signal from filtered recorded signal |
| 208 | Receive GNSS signal |
| 210 | Combine threat signal and GNSS signal |
| 212 | Transmit combined signal to GNSS receiver |
| 214 | Receive characteristics from database |
| 216 | Generate threat signal from characteristics |
| 218 | Receive user input |
| 220 | Generate threat signal from user input |

In other embodiments, only a selection of the above methods is used.

The above embodiments may be used to test a DUT and then analyse the performance of the DUT, by means of monitoring one or more outputs of the DUT such as a comparison of the estimated position, navigation information and timing information as provided by the DUT as compared with the position, navigation information and timing information as extractable from the unaltered GNSS signal (e.g. before combination with the threat signal). Signal to noise ratio outputs from the DUT may also be monitored. Such outputs may be used to assess the performance of the DUT, for example individual parts of a GNSS receiver (and/or antenna or other) as well as the overall performance of the receiver. The performance of component parts can be assessed by gaining access to lower level interfaces that exist within a GNSS receiver. Complete system level performance can be assessed by examining the output of the receiver (and/or antenna or other). Results can be generated at any suitable frequency/interval. Analysis can be carried out over a period of time, over a series of tests or over a comprehensive test plan. The results of such analysis can be sent back to, and stored in, the database and may be associated with the types of threat signals used when assessing the DUT. Thus, it may be possible to establish a relationship between the threat and the impact that threat has on the different types of system it is tested against.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In other embodiments, the device under test (DUT) is another PNT configuration, including: a configuration of a plurality of GNSS receivers; a Controlled Radiation Pattern Antenna (CRPA) configuration; and a Satellite-based Augmentation System (SBAS).

There may be embodiments of the invention which perform a method of generating a test signal for testing a PNT configuration against multiple different threats. Such a method may comprise the steps of receiving, from a database, multiple sets of information for generating a test signal representing two or more different types of threat, the database having a store of data including data representing two or more different types of threat, and generating a test signal which comprises a PNT signal incorporating the multiple simulated threats. The test signal may comprise a threat signal mixed with a PNT signal. The threat signal may be separately generated before being combined with the PNT signal. The test signal may comprise a PNT signal, corrupted at the system level, for example being in the formal of a PNT signal having an evil waveform.

The apparatus of the above described embodiment could be configured to simulate a succession of different threats which occur at different times, possibly overlapping. There may be some periods where only one threat is simulated, others where no threats are simulated and yet others where multiple threats are simulated simultaneously.

The test signals so generated may themselves be tested by means of a test set, which is in the form of a software configurable GNSS receiver which can be used to validate test signals. The software configurable GNSS receiver may be used as a benchmark to prove whether and how a GNSS configuration can cope with the test/threat signals so generated.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A method of testing the performance of a position, navigation and timing (PNT) configuration comprising:
   generating a test signal, comprising the steps of:
   using one or more global navigation satellite system (GNSS) jamming signal detectors to detect at least three different types of real-world threat signals, each being a radio frequency (RF)-based man-made GNSS jamming signal, and recording, to a database, information for the threat signals;
   receiving, from the database, information for at least one of the threat signals,
   generating a corresponding threat signal from the received information;
   combining the corresponding threat signal with a PNT signal via a signal combiner to generate the test signal:
   transmitting the test signal to the PNT configuration;
   receiving an output of the PNT configuration; and
   analysing the output of the PNT configuration to provide an indication of performance of the PNT configuration.

2. The method of claim 1, wherein the information for a threat signal received from the database includes a direct reproduction of the recorded signal.

3. The method of claim 1, wherein the step of receiving information originating from the recorded signal comprises receiving one or more characteristics derived from the recorded signal from the database.

4. The method of claim 3, wherein the step of generating a corresponding threat signal from the information further comprises the steps of:
   filtering the information based on a characteristic of the recorded signal, and
   producing the corresponding signal from the filtered information.

5. The method of claim 4, wherein the characteristic of the recorded signal concerns a parameter defining the variation of the signal in the time domain.

6. The method of claim 4, wherein:
   the characteristic concerns a parameter indicating the bandwidth of the recorded signal, and wherein
   the information is filtered in the frequency domain based on the bandwidth of the detected signal.

7. The method of claim 1, wherein the database comprises data for generating the test signal that simulates threats from at least one of the threats from the group consisting of:
   a spoofing signal;
   a signal affected or generated by solar weather; and
   an evil waveform.

8. The method of claim 1, further comprising a step of receiving an input from a user, and wherein the step of generating the threat signal is performed using the input of the user.

9. The method of claim 1, wherein at least one further test signal is generated in order to simulate different threats, or different simultaneous and independent threats.

10. The method of claim 9, wherein the test signals so generated simulate over a first time period at least one threat representing a first scenario and simulates over a second different time period at least two different threats representing a second scenario such that the at least two threats representing the second scenario includes at least one threat not represented by the first scenario.

11. A method of generating a test signal for testing a PNT configuration, comprising the steps of:
   receiving, from a database, information for a threat signal;
   generating a corresponding threat signal from the received information; and
   combining the corresponding threat signal with a PNT signal via a signal combiner to generate the test signal;
   transmitting the test signal to the PNT configuration;
   receiving an output of the PNT configuration; and
   analysing the output of the PNT configuration to provide an indication of performance of the PNT configuration;
   wherein the database includes data representing three or more different types of threat signals which data has been recorded on the database in the form of information for RF-based man-made GNSS jamming signals previously detected by one or more GNSS jamming signal detectors.

12. The method of claim 11, further comprising the step of saving the output of the PNT configuration to the database and wherein the data representing the different types of threat signals recorded on the database results from using one or more GNSS jamming signal detectors to detect at least three different types of threat signals, each being an RF-based man-made GNSS jamming signal.

13. A threat signal generator for testing the performance of a PNT configuration, comprising:
   a first input for receiving information for a threat signal from a database of different types of threat signals, the database including data representing three or more different types of real-world threat signals which data has been recorded on the database in the form of information for RF-based man-made GNSS jamming signals previously detected by one or more GNSS jamming signal detectors; and
   a signal processing device implemented by software that, when executed by a processor, the processor causes the signal processing device to:

generate a test signal for testing the PNT configuration from the information received at the first input;
combine the corresponding threat signal with a PNT signal using a signal combiner to generate the test signal;
transmit the test signal to the PNT configuration;
receive an output of the PNT configuration; and
analyze the output of the PNT configuration to provide an indication of performance of the PNT configuration.

14. The threat signal generator of claim 13 further including the database comprising the information for the at least three different types of threat signals.

15. A computer software product that when executed on a processor of a threat signal generator causes the threat signal generator to:
generate a test signal for testing a PNT configuration by combining a PNT signal and information received from a database of different types of threat signals, the database including data representing three or more different types of threat signals which data has been recorded on the database in the form of information for RF-based man-made GNSS jamming signals previously detected by one or more GNSS jamming signal detectors;
transmit the test signal to the PNT configuration;
receive an output of the PNT configuration; and
analyse the output of the PNT configuration to provide an indication of performance of the PNT configuration.

16. The computer software product of claim 15 further comprising the database, which includes the data representing the three or more different types of threat signals.

17. The method of claim 1, wherein the at least three different types of threat signals each represent real-world threat signals.

* * * * *